(12) United States Patent
Mattson et al.

(10) Patent No.: US 6,687,713 B2
(45) Date of Patent: Feb. 3, 2004

(54) BUDGET INFORMATION, ANALYSIS, AND PROJECTION SYSTEM AND METHOD

(75) Inventors: Anna J. Mattson, St. George Island, FL (US); Sherri R. Taylor, Tallahassee, FL (US)

(73) Assignee: GroupThink Unlimited, Inc., Tallahassee, FL (US)

( * ) Notice: Subject to any disclaimer, the term of this patent is extended or adjusted under 35 U.S.C. 154(b) by 116 days.

(21) Appl. No.: 09/812,730

(22) Filed: Mar. 20, 2001

(65) Prior Publication Data

US 2002/0026393 A1 Feb. 28, 2002

Related U.S. Application Data

(63) Continuation-in-part of application No. 09/794,304, filed on Feb. 27, 2001.
(60) Provisional application No. 60/185,830, filed on Feb. 29, 2000.

(51) Int. Cl.[7] .............................................. G06F 17/30
(52) U.S. Cl. ...................... 707/104.1; 707/10
(58) Field of Search ................ 707/104.1, 10, 707/1, 4, 203; 705/30, 40, 35, 39, 42, 8; 345/700, 744, 863; 709/203

(56) References Cited

U.S. PATENT DOCUMENTS

| | | | | |
|---|---|---|---|---|
| 5,189,608 A | * | 2/1993 | Lyons et al. ................ 705/30 |
| 5,991,741 A | * | 11/1999 | Speakman et al. ............ 705/30 |
| 6,018,346 A | * | 1/2000 | Moran et al. ................ 345/863 |
| 6,128,602 A | * | 10/2000 | Northington et al. ......... 705/40 |
| 6,341,292 B1 | * | 1/2002 | Cho et al. ...................... 707/4 |
| 6,418,420 B1 | * | 7/2002 | DiGiorgio et al. ............ 705/40 |
| 2001/0011222 A1 | * | 8/2001 | McLauchlin et al. ....... 709/203 |

* cited by examiner

Primary Examiner—Diane D. Mizrahi
(74) Attorney, Agent, or Firm—Allen, Dyer, Doppelt, Milbrath & Gilchrist, P.A.

(57) ABSTRACT

A budget information and creation system includes a budgetary information database that has numerical data and textual identifiers imported from a remote site. The numerical data are extracted from the remote site into a spreadsheet application, and the textual identifiers are extracted from the remote site into a word processing application. An interface with a user for permitting the user to create a budget for a subdivision of the remote site uses at least some of the numerical data and textual identifiers. The created budget is transmitted to the remote site. A budget projection system permits the user to import and view a prior budget for a subdivision of the remote site using at least some of the numerical data and textual identifiers. The user is permitted to enter a projection variable, and the system calculates a projected budget based upon the projection variable and the prior budget.

19 Claims, 30 Drawing Sheets

Budget Detail Information
55 Current
Fiscal Year 2000-2001

Department: Children & Families
Issue Description: ADOPTIONS: RECRUITMENT- OVERSIGHT AND SPECIAL SUBSIDIES

|  | Agency | Governor | HB 2145 as Amended | Senate | Conference |
|---|---|---|---|---|---|
| Dollars | $11,718,253 | $11,718,253 | $11,718,253 | $11,718,253 | $11,718,253 |
| Positions | 0 | 0 | 0 | 0 | 0 |

552 ) 551

Display Dollar Breakout Options
554

*Following is the issue narrative justification submitted by each state agency in accordance with Legislative Budget Request Instructions for Fiscal Year 2000-2001, dated June 1999.*

AND SPECIAL SUBSIDIES                                     553
AGENCY ISSUE NARRATIVE:
2000-2001 BUDGET YEAR NARRATIVE:
AGENCY NARRATIVE:
REFERENCES:
STRATEGIC TYPE: II - FULL TIME CARE REQUIREMENTS
STRATEGIC TASK: FS04.2 - ACHIEVE PERMANENCY FOR CHILD VICTIMS WHO HAVE BEEN REMOVED FROM THEIR HOMES
TARGET GROUP: CHILD VICTIMS OF ABUSE OR NEGLECT WHO BECOME ELIGIBLE FOR ADOPTION
ISSUE TITLE: ADOPTIONS: RECRUITMENT, OVERSIGHT, AND SPECIAL SUBSIDIES OF THIS REQUEST. $6,603,830 IS FOR GENERAL REVENUE AND $5,114,423 IS FOR FEDERAL GRANTS TRUST FUNDS. TITLE IV-E.
THE NUMBER OF FOSTER CHILDREN WHO CANNOT BE REUNITED WITH THEIR FAMILIES CONTINUES TO INCREASE. THERE ARE
EXTENSIVE LEGAL PROCEEDINGS NECESSARY TO TERMINATE PARENTAL RIGHTS (TPR).
SUBSEQUENT TO TPR, AN ADOPTIVE HOME
MUST BE FOUND AND OVERSIGHT AND SUPPORT MUST BE PROVIDED TO ENSURE A GOOD MATCH WHEN CHILDREN ARE ADOPTED,
FAMILIES RECEIVE SPECIAL MAINTENANCE ADOPTION SUBSIDIES TO HELP WITH ANY SPECIAL NEEDS THAT THESE CHILDREN HAVE.
JUSTIFICATION:
ADOPTIONS - $7,898,374
THE ADOPTION PROGRAM IS RESPONSIBLE FOR RECRUITING PROSPECTIVE ADOPTIVE FAMILIES, PREPARING THE CHILDREN FOR
ADOPTION AND SUPERVISING THE PLACEMENTS UNTIL FINALIZATION.
THE DEPARTMENT'S STANDARD LEGISLATIVE BUDGET REQUEST INSTRUCTIONS WERE USED TO CALCULATE THE COST

FIG. 10

+Expand | -Collapse

| | Dollars | Positions |
|---|---|---|
| ▽ GRANTS AND AIDS - CONTRACTED SERVICES | 7,898,374 | 0.00 |
| ☐ ⊙ Agency  FEDERAL GRANTS TRUST FUND ⎱ 561 | 3,632,462 | 0.00 |
| ☐ ⊙ Agency  GENERAL REVENUE FUND ⎰ | 4,265,912 | 0.00 |
| ▽ MAINTENANCE ADOPTION SUBSIDY | 3,485,737 | 0.00 |
| ☐ ⊙ Agency  FEDERAL GRANTS TRUST FUND | 1,481,961 | 0.00 |
| ☐ ⊙ Agency  GENERAL REVENUE FUND | 2,003,776 | 0.00 |
| ▽ MEDICAL COST OF SUBSIDIZED ADOPTIONS | 334,142 | 0.00 |
| ☐ ⊙ Agency  GENERAL REVENUE FUND | 334,142 | 0.00 |
| | 11,718,253 ⎦ 562 | 0.00 ⎦ 563 |

+Expand | -Collapse

Agency Budget Detail
Budget Entity: 60600700 FAMILY SAFETY & PRESERV
Program: 04031001006 PLACEMNT/SUPERVISN-CHILDRN
Issue Type: 10
Appropriation Category: 100778 GRANTS AND AIDS - CONTRACTED SERVICES
Summary Issue: 4000000 AGENCY STRATEGIC PRIORITIES
Detail Issue: 4000060 ADOPTIONS: RECRUITMENT, OVERSIGHT AND SPECIAL SUBSIDIES
Fund Source: 2261 FEDERAL GRANTS TRUST FUND
Fund Source Indicator: FEDERAL FUNDS
Item of Expenditure: AID TO LOC GOV - OPERATION
Dollars: $3,632,462.00
Positions: 0.00

1367  Agriculture And Consumer Services, Department Of, And Commissioner Of Agriculture
Office Of The Commissioner And Division Of Administration
Agricultural Law Enforcement 1368  Agriculture And Consumer Services, Department Of, And Commissioner Of Agriculture
Office Of The Commissioner And Division Of Administration
Agricultural Law Enforcement ...ority and
...teria ...propriate performance
and measures for service
contracts. However, if
performance criteria
..............more..........  602 →
1367 SALARIES AND BENEFITS
POSITIONS 41
FROM GENERAL REVENUE FUND..
......2,280,733
FROM CITRUS INSPECTION
TRUST FUND....243,983
FROM GENERAL INSPECTION
TRUST FUND....46,971
1368 OTHER PERSONAL
SERVICES
FROM GENERAL REVENUE FUND..
......15,000
From the funds in Specific
Appropriation 1368, an agency
may employ an
individual in other personal
services for temporary
employment only in
accordance with Chapter 110,
Florida Statutes. Therefore, an Governor - Governor's Recommended Appropriations
Fiscal Year 2001-2002
Specific Appropriation: 1367
Agriculture And Consumer Services, Department Of, And Commissioner of Agriculture
1367 SALARIES AND BENEFITS POSITIONS 41          61
FROM GENERAL REVENUE FUND.......2,280,733
FROM CITRUS INSPECTION TRUST FUND...243,983
FROM GENERAL INSPECTION TRUST FUND....46,971   Close Dollar Breakout Options

611  Sorted By: 612
○ Fund ⦿ Issue/Fund

613    +Expand | -Collapse

| | Fund | Dollars | Positions |
|---|---|---|---|
| ▽ total for Category - Click to see details | | $2,571,687 | 41 |
| ▽ ESTIMATED EXPENDITURES - OPERATIONS | | | |
| | CITRUS INSPECTION TF | $2,451,347 | 41 |
| | GENERAL INSPECTION TF | $233,557 | |
| | GENERAL REVENUE FUND | $44,969 | |
| Positions | | $2,172,821 | |
| 8 | | $0 | 41 |
| ▽ GENERAL PAY INCREASE - 3 MONTH ANNUALIZATION | | $2,270 | 0 |
| | GENERAL REVENUE FUND | $2,270 | |
| ▽ GENERAL PAY INCREASE EFFECTIVE 10/1/2000 | | $6,809 | 0 |

FIG. 17 search results for ""law" and "school""

_62_

5 documents found

| Specific Appropriation | Department/Appropriation Category | Proviso Language |
|---|---|---|
| ☐ 18 _623_ | Education, Department Of, And Commissioner Of Education Education - Fixed Capital Outlay _621_ | 18 FIXED CAPITAL OUTLAY _622_ STATE UNIVERSITY SYSTEM PROJECTS FROM PUBLIC EDUCATION CAPITAL OUTLAY AND DEBT SERVICE TRUST FUND........ 154,537,340 The following projects in the State University System are included in the funds appropriated in Specific Appropriation 18. FAMU Utilities/Infrastructure/Capital Renewal/Roofs (p,c)...... 2,149,381 ..............more.............. |
| ☐ 2146 | | 2146 SPECIAL CATEGORIES GRANTS AND AIDS - PRE-SCHOOL PROJECTS FROM GENERAL REVENUE FUND...... ..103,765,000 From the funds in Specific Appropriation 2146, the Agency for Workforce Innovation is required to count at least $29.2 million of pre-kindergarten funds as maintenance of effort for Temporary Assistance to Needy Family funds. This shall not be construed as a transfer of funds, but rather as authorization to designate these funds as ..............more.............. |
| ☐ 118 | Education Dep | 118 AID TO LOCAL GOVER |

FIG. 18

Governor-Governor's Recommended Appropriations
Fiscal Year 2001-2002                                                            63

Specific Appropriation: 18
Education, Department Of, And Commissioner Of Education
18 FIXED CAPITAL OUTLAY
STATE UNIVERSITY SYSTEM PROJECTS
FROM PUBLIC EDUCATION CAPITAL OUTLAY AND
DEBT SERVICE TRUST FUND..........154,537,340
The following projects in the State University System are included in
the funds appropriated in Specific Appropriation 18.
FAMU
Utilities/Infrastructure/Capital Renewal/Roofs (p,c)...... 2,149,381
Journalism Building (C,E)..................................... 500,000
Coleman Library Expansion (C,E)........................... 2,035,500
Campus Electrical Upgrades (P,C)............................ 2,787,500
Land Acquisition (s)............................................. 1,500,000
Law School Building (P)....................................... 1,331,551
FAU
Utilities/Infrastructure/Capital Renewal/Roofs (P,C)...... 1,500,000
Life Behavioral Science Complex Renov/Expansion (E)........ 2,500,000
Student Support Service Building (C)........................ 13,200,000
North Palm Beach Library Expansion (P)...................... 500,000
College of Business Expansion/Remodeling (P)................ 800,000
FGCU
Multi-Purpose Building (E)..................................... 700,000           ←631
Teaching/Gymnasium (C,E)..................................... 4,695,188
Classroom/Offices/Labs, Academic 5 (C)...................... 5,800,000
Library Expansion (C,E)........................................ 7,500,000
FIU
Utilities/Infrastructure/Capital Renewal/Roofs (P,C)...... 2,750,000
Health & Life Sciences Expansion/Rem/Renov (C,E)............ 6,484,330
Law School Building (P)....................................... 1,331,551
Office/Classroom Building (P)..................................800,000
North Campus Science/Classroom Building (P).................. 750,000
FSU
Utilities/Infrastructure/Capital Renewal/Roofs (P,C)...... 3,250,000
Montgomery Gym Remodeling (C,E)............................. 3,000,000
Basic Sciences Building (P,C,E)..

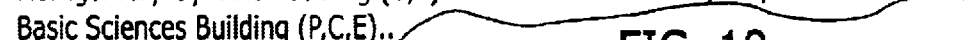

| HOME | CONTACTS | BUDGET DETAILS | BUDGET BILLS | TRACKING | RESOURCES |

FLORIDA BUDGET.COM
Connecting Budget & Technology

Tracking Budget Data
Planning
  Issues by Department
Current
  Issues by Department

63

633 → Your Tracking Folders
Anna Mattson
Organization: GroupThink
Click here to refresh the folder list ☐ Chiropractic
☐ Citrus Canker
☐ Contracts - Fy 2001-02
☐ Leon
☐ Medicaid Related
☐ Test Tracking\All Issues by Department — 308
Planning
Fiscal Year 2001-2002
Previous Next Expand Collapse Search
Full Screen

[Tracking]    [    ] — 634

☑ Private tracking - not available to others in your Organization ⓘ

632

| | | Agency $ | Pos | Governor $ | Pos | $ Requested | Positions % |
|---|---|---|---|---|---|---|---|
| ▷ ☐ | Agriculture | | | | | $489,407,538 | 3,858 |
| ▷ ☐ | Banking & Finance | | | | | $76,327,620 | 936 |
| ▷ ☐ | Business & Professional Regulation | | | | | $138,713,749 | 1,580 |
| ▷ ☐ | Children & Families | | | | | $4,166,698,628 | 25,922 |
| ▷ ☐ | Citrus | | | | | $80,265,814 | 150 |
| ▷ ☐ | Community Affairs ← 631 | | | | | $617,742,277 | 374 |
| ▷ ☐ | Corrections | | | | | $1,780,706,620 | 26,932 |
| ▷ ☐ | Education | | | | | $16,088,933,802 | 31,332 |
| ▷ ☐ | Elder Affairs | | | | | $255,766,611 | 368 |
| ▷ ☐ | Environmental Protection | | | | | $1,667,263,047 | 3,606 |
| ▷ ☐ | Fish & Wildlife | | | | | $203,309,715 | 1,811 |
| ▷ ☐ | Governor | | | | | $167,584,778 | 282 |

Anna Mattson
Organization: GroupThink
Citrus Canker Tracking Data
Double Click on Item to Open for adding Comments or Review Detail ⊕
+Expand | -Collapse | Delete Selected

| | Agency $ | Governor $ | House $ | Appropr |
|---|---|---|---|---|
| ▽ FY 2001-2002 Budget Data | $450,930,615 | $0 | $0 | $0 |
| ▽ Agriculture - 7 Documents | $450,930,615 | $0 | $0 | $0 |
| Eradication Discuss with Rep. Lacasa | $55,607,528 | | | $0 |
| Geographic Information System - Pest Control/Tracking System GIS/GPS - Is there coordination of GIS Systems - Statewide (Call Roy) | $387,687,939 | | | $0 |
| Miami-Dade Tree Restoration Project (See Similar Issue - Tree Replacement) | $883,000 | | | $0 |
| Smuggling Interdiction To Control Agricultural Pests And Diseases | $3,500,000 | | | $0 |
| Staffing For Agricultural Inspection Stations Do we need additional staffing at Inspection Stations? Check with the Subcommittee Chairman. | $1,368,370 | | | $0 |
| Tree Replacement Program Tree Replacement/Tree Restoration -- Discuss with Analyst | $883,778 | | | $0 |
| | $1,000,000 | | | $0 |

64 ↑ 641

+Expand | -Collapse | Delete Selected

FIG. 21

[Save] [Close] [Mark as Shared]

Private Tracking Information

Organization: GroupThink
Folder: Chiropractic

Comments ⊕ — 651

65

Budget Detail Information
Planning Fiscal Year 2001-2002

Department: Education
Issue Description: SCHOOL OF CHIROPRACTIC MEDICINE - FLORIDA STATE UNIVERSITY
 Agency    Governor
Dollars: $1
Positions: 0

Display Dollar Breakout Options

Following is the issue narrative justification submitted by each state agency in accordance with Legislative Budget Request Instructions for Fiscal Year 2001-2002

— 652

This issue is a placeholder for the Chiropractic School being developed by Florida State University. Proviso states that Appropriation 161 includes $1,000,000 for Florida State University to develop an implementation plan, in consultation with the Board of Regents, for the establishment of a school of chiropractic education at Florida State University. The implementation plan shall be developed with the...

FIG. 22

Planning
Fiscal Year 2001-2002

Search Results
The Following 43 Document(s) matched your search criteria: "law " and "school"

| Tracking | Law School Funding |

☞ ☐ Private tracking - not available to others in your Organization ⓘ
Click here to Select all to track

|   | Agency $ | Pos | Governor $ | Pos | $ Requested Positions % of total positions |
|---|---|---|---|---|---|
| ☑ EDUCATION - Famu and Flu Pre-Law Programs | $2,000,000 | 0 | | | |
| ☑ JUSTICE - Attorney Recruitment | $83,823 | 2 | | | <u>66</u> |
| ☑ EDUCATION - Famu and Flu Law Schools | $11,500,000 | 0 | $11,500,000 | 0 | |
| ☑ EDUCATION - Law Enforcement Academies | $1,937,236 | 0 | | | |
| ☑ EDUCATION - School Resource Officers Network | $350,000 | 0 | | | |
| ☑ EDUCATION - Public School Technology To Lottery | | | $62,400,000 | 0 | |
| ☑ EDUCATION - Public School Technology From General Revenue | ($103,765,000) | 0 | ($62,400,000) | 0 | |
| ☑ EDUCATION - Pre-School Projects - General Revenue | $103,765,000 | 0 | ($103,765,000) | 0 | |
| ☑ EDUCATION - Charter Schools Facilities And Equipment | $27,700,000 | 0 | $27,700,000 | 0 | |
| ☑ EDUCATION - Florida Teachers Lead Program To Lottery | | | $15,044,000 | 0 | |

FIG. 23

FLORIDA BUDGET.COM
Connecting Budget & Technology

| HOME | CONTACTS | BUDGET DETAILS | BUDGET BILLS | TRACKING | RESOURCES |

309

Resources

Previous Next Expand Collapse

| Appendix |
|---|
| Budget Acronyms Reference Resource |
| Budgetary Process - Chart |
| Budgetary Process - Explanation |
| Glossary of Budgeting Terms |
| Guide to Using www.floridabudget.com |
| Guide to Using www.floridabudget.com - PDF |
| State Email Standards - or how to get in touch with anyone by mail! |
| Appropriations Bill Documents |
| 2000 Appropriations Bill - Veto List - PDF format |
| Budget Timelines |
| Annual Calendar of Major Events - Statutory Requirements |
| Florida's Budgetary Process |
| Florida Joint Legislative Budget Commission |
| Organization Meeting August 24, 2000 - PDF Format |
| Organization Charts |
| Agriculture and Consumer Services |
| Banking and Finance |
| Business and Professional Regulation |
| Children and Families |
| Citrus |
| Commission on Ethics |
| Community Affairs |
| Corrections |
| Education |
| Elder Affairs |
| Enterprise Florida |
| Environmental Protection |
| Environmental Protection - Marine Fisheries Commission |
| Fish and Wildlife Conservation Commission |

671

67

Previous Next Expand Collapse

FIG. 24

BUDGET INFORMATION, ANALYSIS, AND PROJECTION SYSTEM AND METHOD

CROSS-REFERENCE TO RELATED APPLICATION

This application is a continuation-in-part of copending and pending application Ser. No. 09/794,304, "Budget Information and Analysis System and Method," filed Feb. 27, 2001, which application claims priority from provisional application Ser. No. 60/185,830, filed Feb. 29, 2000, entitled "Querying Method to Budget Information Network via Internet Access." The disclosure of that application is hereby incorporated by reference into the present application.

BACKGROUND OF THE INVENTION

1. Field of the Invention

The present invention relates to systems and methods for accessing budgetary information and, more particularly, to such systems and methods for accessing governmental budgetary information via a network and also for performing budgetary projections therefrom.

2. Description of Related Art

Governmental budget systems, such as that known in the art in Florida, are often housed on mainframes, with program files being difficult to access and manipulate, especially for a person not conversant with complex computer coding. To properly use and understand such applications typically requires extensive training and a background in the budget desired to be accessed. For elected officials, a staff is required to mine data as desired; for a person outside the government, it would be virtually impossible to obtain such data in a desired form.

In the exemplary Florida system, operational systems data for state personnel, accounting, budgeting, and planning are housed in separate mainframe computers that are not linked and are incompatible. Reengineering such a system would present a difficult, time-consuming, and expensive challenge.

SUMMARY OF THE INVENTION

It is therefore an object of the present invention to provide a system and method for accessing budgetary data via a network.

It is a further object to provide such a system and method that is indexed under a plurality of categories.

It is another object to provide such a system and method that is accessible via the Internet.

It is an additional object to provide such a system and method that contains links to related electronic sites for correlating budget information with other data.

It is also an object to provide such a system and method that is tailored for governmental budgetary data.

It is yet a further object to provide such a system and method that can perform zero-based budget analysis.

It is yet another object to provide such a system and method that can perform formula-based budget analysis.

It is yet an additional object to provide such a system and method that can perform budgetary projections.

These and other objects are achieved by the present invention, a budget information system that comprises a budgetary information database that includes numerical data and textual identifiers imported from a remote site. The numerical data are extracted from the remote site into a spreadsheet or similar application, and the textual identifiers are extracted from the remote site into a word processing application. The system also comprises means for receiving a keyword selected by a user and means for matching the database with the keyword. The keyword "selection" may comprise, for example, the user's entering the keyword into a search engine; alternatively, the selection may comprise clicking an item on the screen with a pointing device, that item linked to related data in the database. Means for formatting and outputting related budget data and a textual identifier that were found from the database search commensurate with the keyword match permit the user to receive correlated budget data on a desired topic.

Another aspect of the present invention are methods for building, accessing, and using a budget information system. This method comprises the steps of accessing a database containing raw budget data and textual information on a plurality of budgetary subdivisions. Next a list of titles of at least some of the budgetary subdivisions is compiled, and a first computer screen containing the list of titles is created.

In use, a numerical record on a selected budget subdivision is retrieved into a spreadsheet application, and a textual record on the selected budget subdivision is retrieved into a word processing application. A second screen is then formatted that contains the numerical record and the textual record in tabular form, and a link is provided between a title of the subdivision on the first screen with the second screen.

Yet another aspect of the invention is a budget information and creation system that comprises a budgetary information database. This database comprises numerical data and textual identifiers imported from a remote site. The numerical data are extracted from the remote site into a spreadsheet application, and the textual identifiers are extracted from the remote site into a word processing application.

Means are provided for interfacing with a user and for permitting the user to create a budget for a subdivision of the remote site using at least some of the numerical data and textual identifiers. Once the budget is created, means are employed for transmitting the created budget to the remote site.

A further aspect of the present invention is a budget projection system that comprises the a budgetary information database as above and means for interfacing with a user. Means are also provided for permitting the user to import and view a prior budget for a subdivision of the remote site using at least some of the numerical data and textual identifiers. The user is permitted to enter a projection variable, and means are employed for calculating a projected budget based upon the projection variable and the prior budget.

A multiplicity of features is provided by the present system and methods, including, but not intended to be limited to:

- the ability to review data imported from disparate planning, budget, accounting, and personnel sources across subdivisions/agencies in order to effectively manage resources;
- the ability to access the data via a network, such as the Internet, from any location and any time;
- the integration of sources of operational data;
- a searchable data system;
- the ability to track items of interest for review, including business processes that are deemed to be of high or low priority, the budget needed to support that process, the positions necessary, and the expense related to that process;

the ability to review business processes the ability to "drill down" (expand) expense category details;

the ability to review employee position data in context of the planning documents, such as support of a particular process, salary information, work location, etc.;

the ability to model budget projections based upon prior data and a predetermined projection variable; and the ability to perform formula-based budgeting.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 10 is a screen tabulating budget detail information and presenting issue narrative justification.

FIG. 11 is a screen expanding on budget details for a selected item.

FIG. 12 is a screen giving agency budget details.

FIG. 17 is a screen giving details of a specific selected appropriation.

FIG. 18 is a screen giving results of a search on budget bills.

FIG. 19 is a screen giving details of an appropriation.

FIG. 20 is a screen for selecting items to be tracked.

FIG. 21 is a screen containing details of a tracked folder.

FIG. 22 is a screen containing personalized comments and textual information on a tracked item.

FIG. 23 is a list of reference materials available on the system.

FIG. 24 is a screen listing available reference materials.

DETAILED DESCRIPTION OF THE PREFERRED EMBODIMENTS

A description of the preferred embodiments of the present invention will now be presented with reference to FIGS. 1A–26. The particular embodiment disclosed herein is directed to an interactive budget information system for state or other governmental budgetary data, here Florida. It will be understood by one of skill in the art, however, that the system is adaptable to any budgetary information desired for presentation to a remote user, such as corporate or other institutional budget and financial data. Therefore, the generic term subdivisions used herein refers in the specific governmental case to agencies or departments; likewise, the subdivisions are broken down into line items, which refers to issues, which themselves are typically broken down further into individual expenditures.

Creation of Budget Information System

Figure 1A:
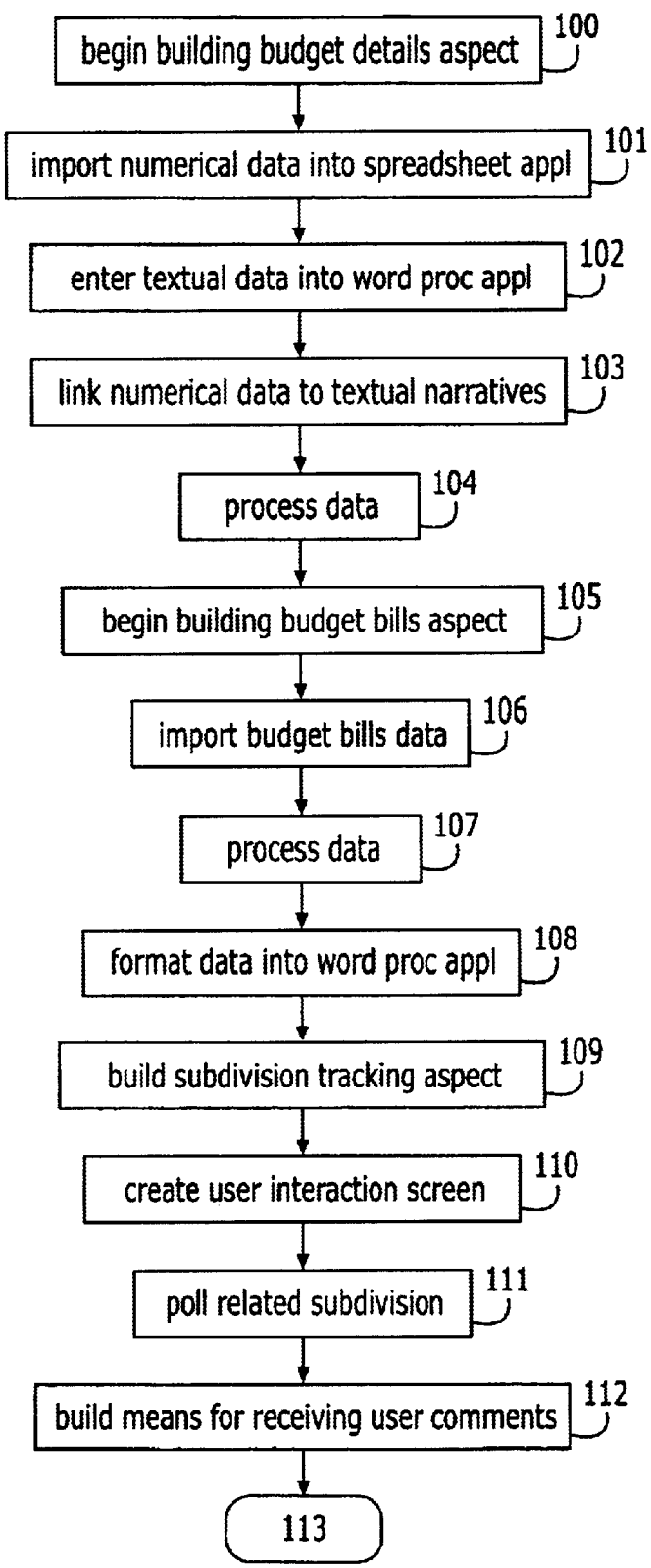
FIGS. 1A, 1B is a flow chart of the method for creating the information system of the present invention.
Figure 1B:
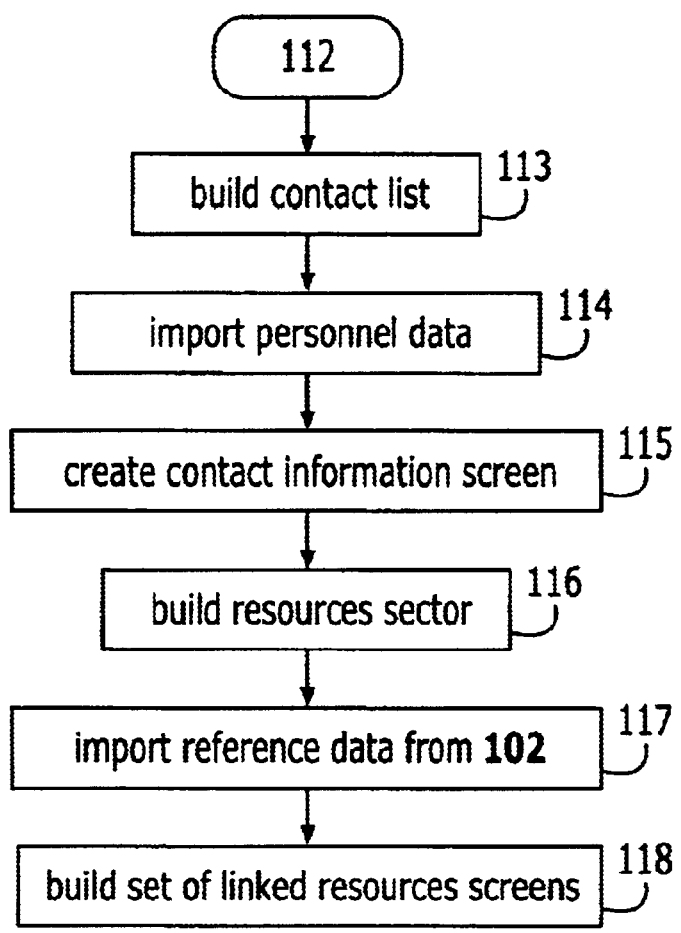
Figure 2:
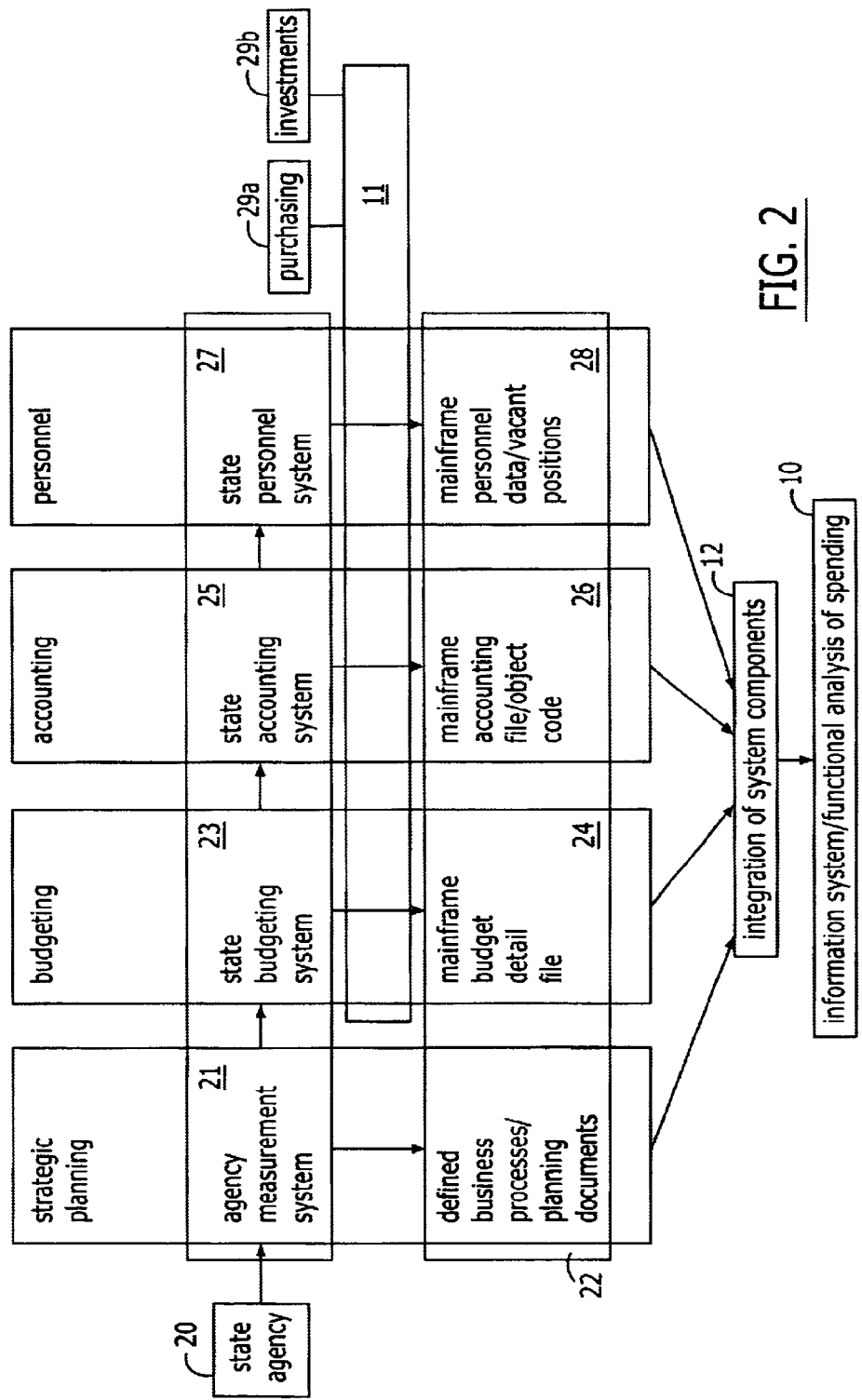
FIG. 2 is a schematic diagram showing a functional analysis of spending data.
Figure 3:
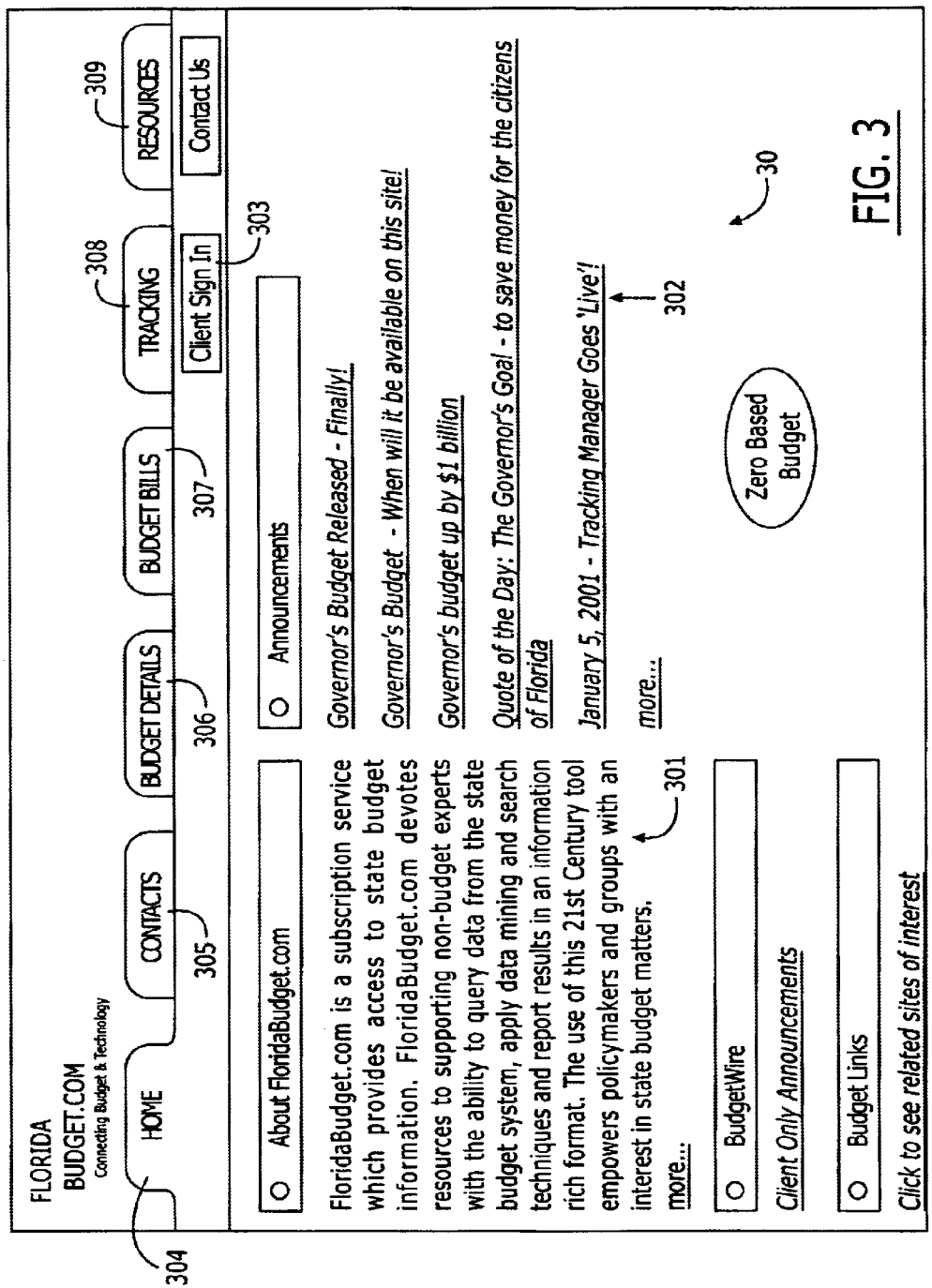
FIG. 3 is a home page screen for the system accessed via the Internet.

The method for building the budget details aspect of the system 10 of the present invention (block 100) is illustrated in flowchart form in FIGS. 1A, 1B, and the functional flow of agency data used to supply the system 10 is shown in FIG. 2. In the particular embodiment illustrated here, the budget data are imported from a mainframe computer located at a central site, such as a state capital. In the specific case of Florida, such data files are received from the Office of the Governor, Office of Systems Design and Development. A new document is created in the system site to which the imported data files are attached. This step comprises importing numerical data into a spreadsheet application, such as, but not intended to be limited to, Excel or Lotus software (block 101), creating a budget detail database and excluding portions of the files not desired for inclusion in this database, such as Bill data. The next step comprises importing the textual data into a word processing application, such as, but not intended to be limited to, Lotus Notes or Lotus Script (block 102). The numerical data are linked to the textual narratives (block 103), as will be discussed in the following. These data are imported into a system site computer, where all further processing (block 104) takes place. Some form of data massaging may be required, as will be understood by one of skill in the art, depending upon the form in which they are supplied, such as uncompressing or removing record delimiters.

In the current embodiment, the system 10 integrates data from a plurality of mainframe computers, each housing disparate systems, and creates a web-enabled information site. Such an integration of information will enable users to review planning, budget, accounting, personnel, purchasing, and investment data across agencies in order to effectively manage resources. Referring to FIG. 2, it can be seen the budget data flow from, for example, a state agency 20, which provides data for the agency measurement system 21. This system 21 contains defined business processes and planning documents 22, including planning documents for each agency, long-range program plans, business processes, and data that are captured at a predetermined frequency, such as quarterly.

The agency measurement system 21 provides data for the state budgeting system 23, which contains mainframe budget detail files 24. Among these are included agency budgeting data, with numeric and narrative data included, agency requests, Governor's recommendations, house/senate recommendations, conference appropriations bills, and veto items.

The state budgeting system 23 provides data for the state accounting system 25, which contains the mainframe accounting file object codes 26, including expense data on contract information and expense type. The data are captured at a predetermined frequency, such as quarterly. The state accounting system 25 provides data for the state personnel system 27, which contains mainframe personnel data such as salary, title, location, and job type, and information on vacant positions 28, including salary range, title, location, job type, and length of the vacancy. Data are also captured at predetermined frequencies, such as quarterly. Purchasing data 29a and Investment data 29b feed, along with budgeting 23, accounting 25, and personnel 27 systems feed into an integrated financial management system 11. The system components 22, 24, 26, 28 are further integrated 12 by the system 10 and serve as sources for the system 10. Steps 101, 102 are repeated each time a new iteration of the state budget is released, from an original agency request, through a legislative session with each version of the budget from the House and the Senate, and the Governor's office, to the final appropriations and the Governor's vetoed items. Thus FIG. 2 serves as a template indicating the structure of a zero-based budget reviewing system, permitting data integration, search capabilities, and data mining and reporting, as will be detailed in the following.

The system 10 also incorporates the building of a plurality of linked screens that will use all the budgetary numerical and textual data housed in the local computer. These screens, which will be detailed in the following section, include a "home," or entry, page comprising a sign in feature (name, password, etc.). Linked to the home page are a plurality of system sectors accessed by selecting from a plurality of tabs.

The system 10 also permits a user to access information on budget bills (block 105) as above for the budget data. This aspect of the system 10 is created by importing data from the mainframe computer at the central site (block 106), copying the data into a file, massaging the data as needed (block 107), copying the data into the database created during the creation of the Budget Details, preparing the table titles from the word processing file, and formatting the information into the word processing program (block 108).

A further feature of the system 10 comprises the ability to track subdivisions of the budget database (block 109). This feature is built by using a software application that has been written to establish tracking records in a created tracking database for each item tracked. This record is unique to the user creating the tracking record and has a unique folder name associated therewith. If the tracking record already exists, it is updated with the latest budget data. The tracking record is linked to the original budget item by a unique ID number. When the tracking record, which is editable for the user, is opened, the original budget item document is retrieved and displayed within the same document, which enables the tracking item to appear as the user's private version of the original document, with the user's comments associated to the budget item. The user interface screen, which is adapted to receive a user selection (block 110), triggers a polling of the subdivision related to that selection (block 111) to update the data each time the user accesses the system 10. The user comments (block 112) remain with the folder item.

Another feature of the system 10 comprises the presentation of a list of contacts (block 113) associated with each subdivision/agency. This element is built by pulling personnel data imported at step 102 into a file (block 114) and creating a screen listing name and contact information (block 115).

A resources sector is created (block 116) to include reference information, with data included from the importation of data at step 102 and other explanatory material (block 117) to assist a user in navigating the state government system, which may have been created from other sources as well as the central site database to build a set of linked resources screens (block 118).

Accessing and Using the Budget Information System

In the exemplary embodiment presented herein, a user desiring budgetary information enters the system 10 via a network, such as the Internet, by entering a web site hosting the system 10. A home page screen 30 (FIG. 3) appears, with a description of the site 301 and various electronic links ("hot" links) to, among other things, announcements 302. In order to view the data, the user in this embodiment must sign in 303, although this is not intended as a limitation. A plurality of tabs 304–309 at the top of the screen 30 provide access to the identified sectors of the system 10, the decision hierarchy for which is shown in FIG. 4.

Figure 4:
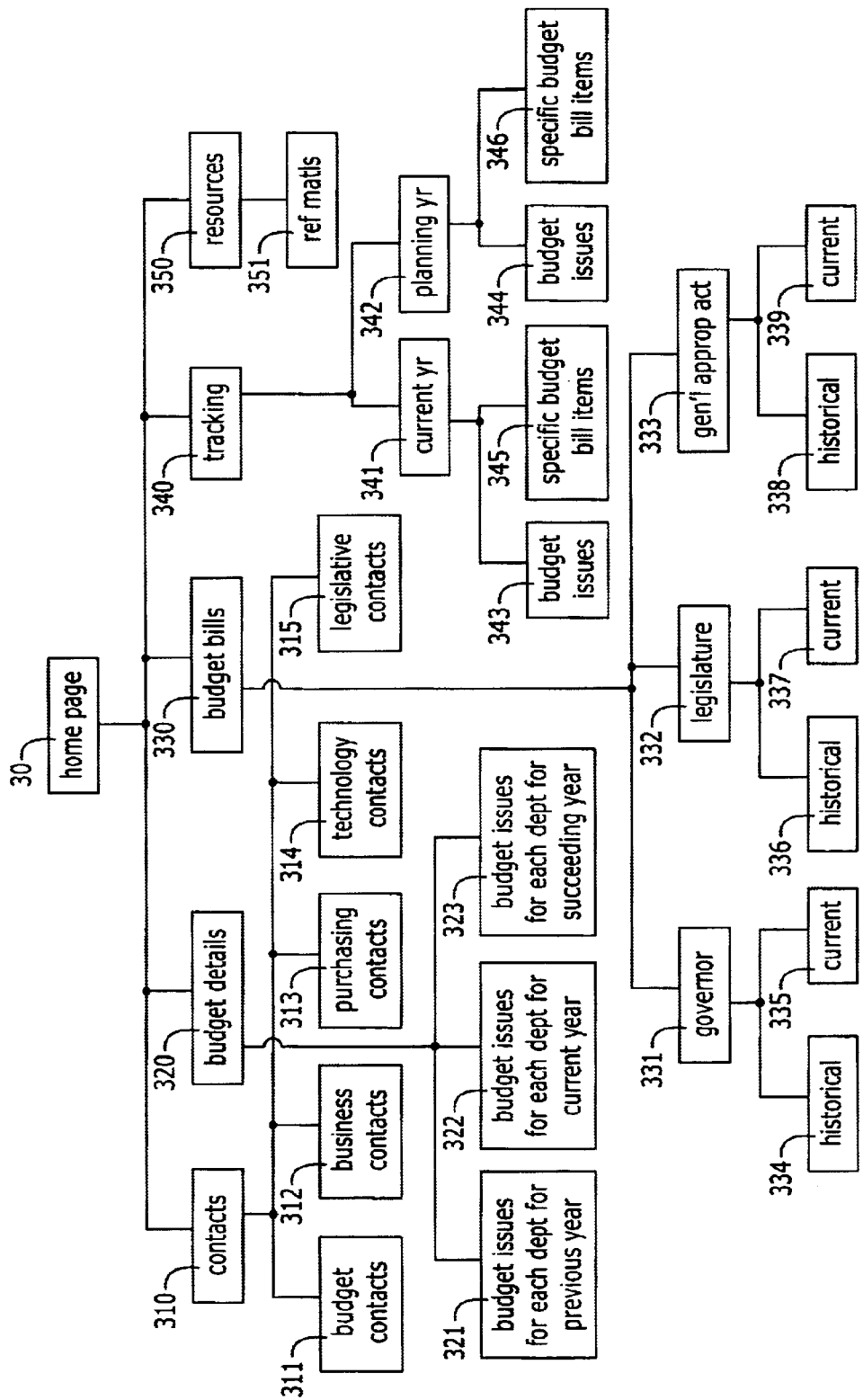
FIG. 4 is a decision chart of information screens accessible by the system.
Figure 5:
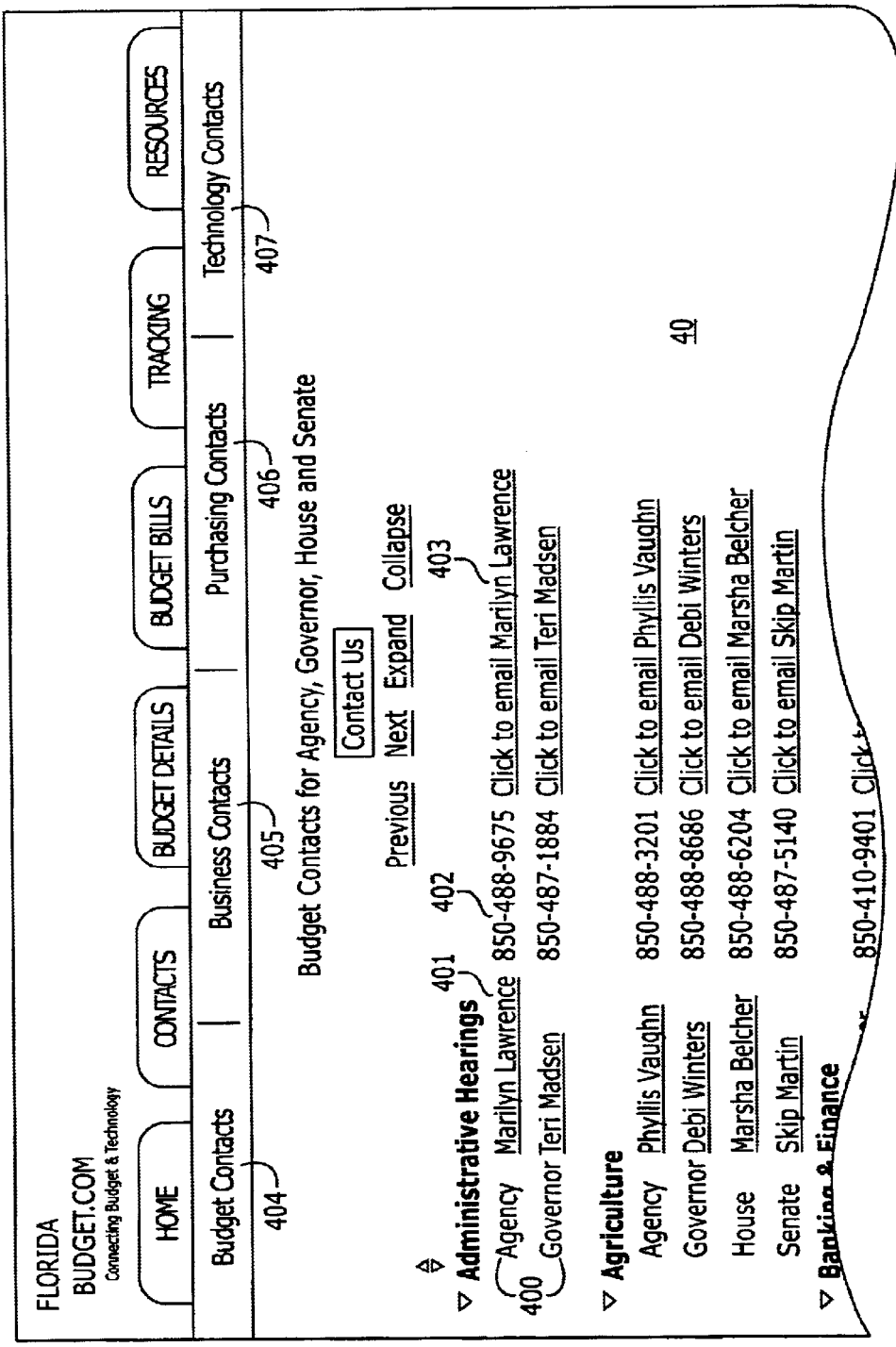
FIG. 5 is an exemplary contact data screen.

If the user selects the "contacts" tab 305, block 310 on FIG. 4, a screen 41 appears (FIG. 5) that lists budget contacts broken down into subdivisions/agencies. Each agency listing includes contact people reporting to one or more parts of the government 400, by name 401, telephone number 402, and hot link to email 403. Also belonging to the contact sector are screens (not shown) for budget contacts 311, business contacts 312, purchasing contacts 313, technology contacts 314, and legislative contacts 315 accessible by subtabs 404–407.

Figure 6:
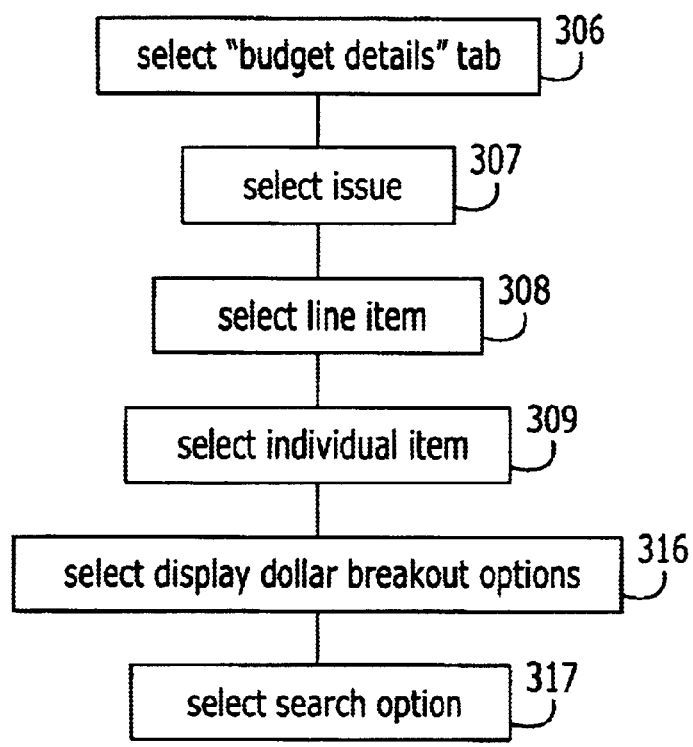
FIG. 6 is a flow chart of the method for entering the system for accessing budgetary data using the system of the present invention.
Figure 7:
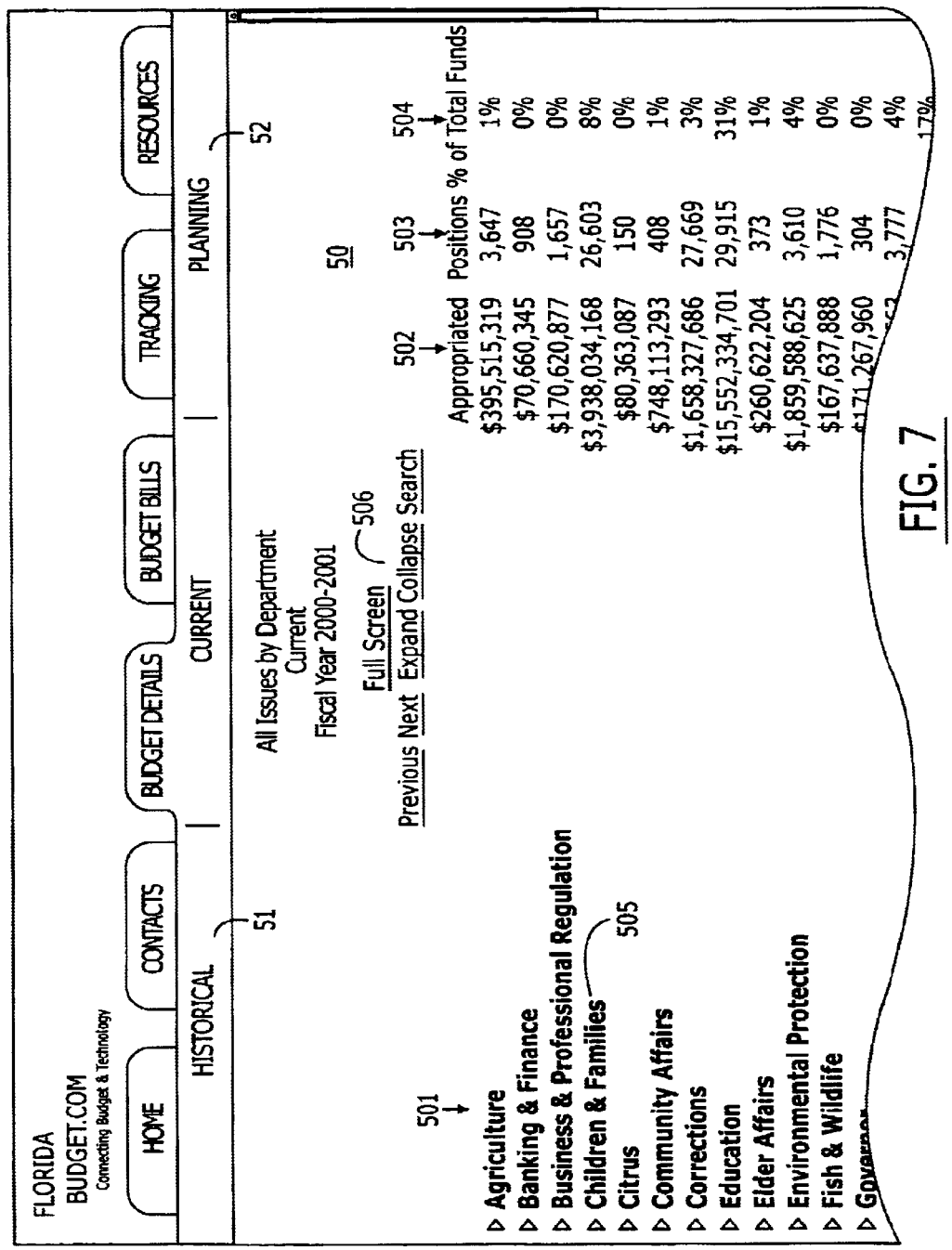
FIG. 7 is a screen tabulating budget issues for the current fiscal year.
Figure 8:
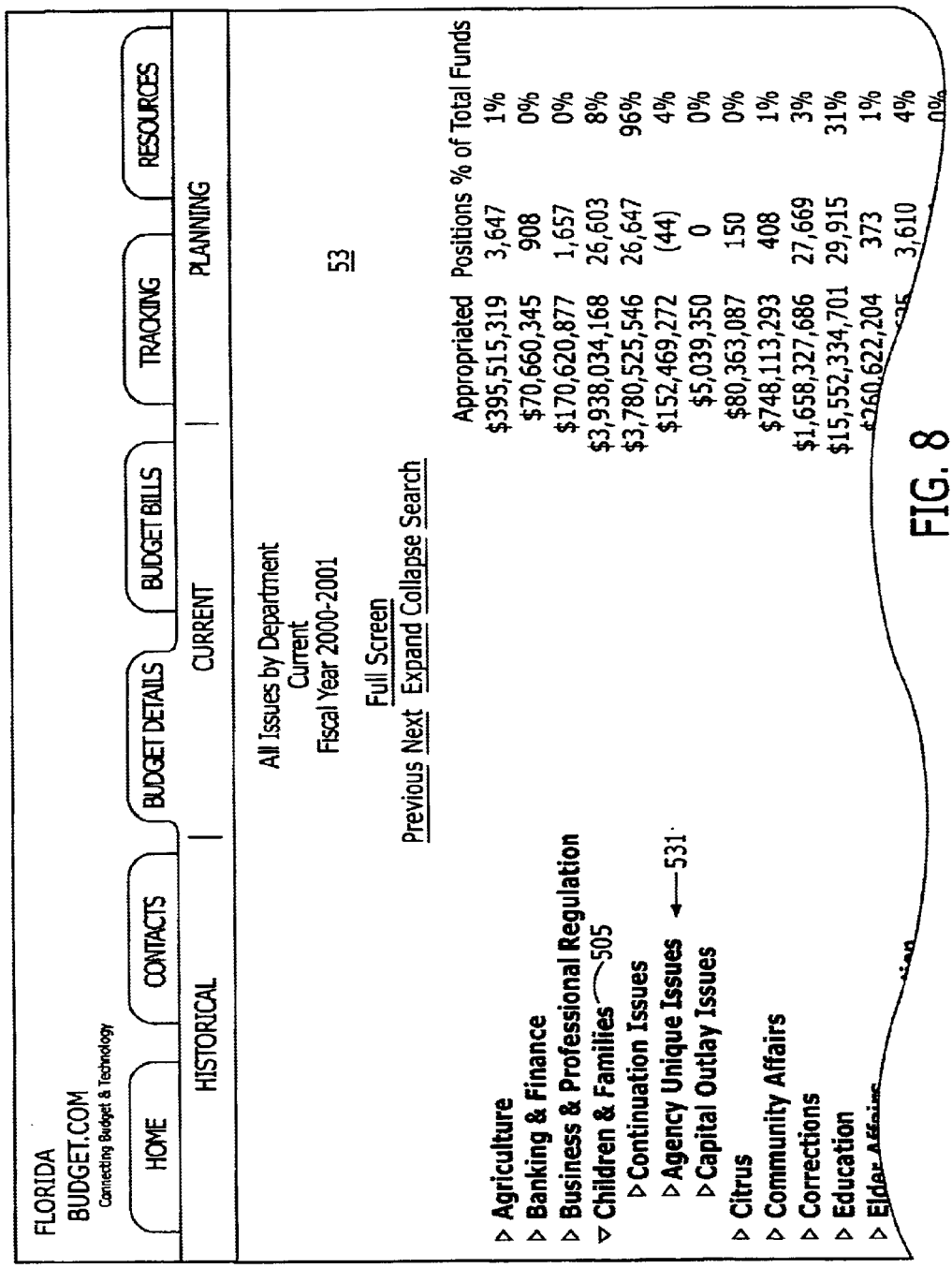
FIG. 8 is a screen tabulating budget issues with one issue further divided for the current fiscal year.
Figure 9:
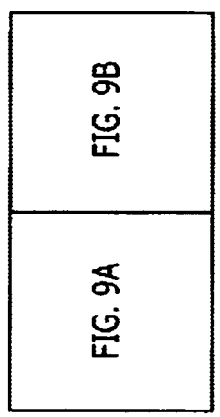
FIG. 9 is a screen tabulating line item divisions for a selected issue.
Figure 9A:
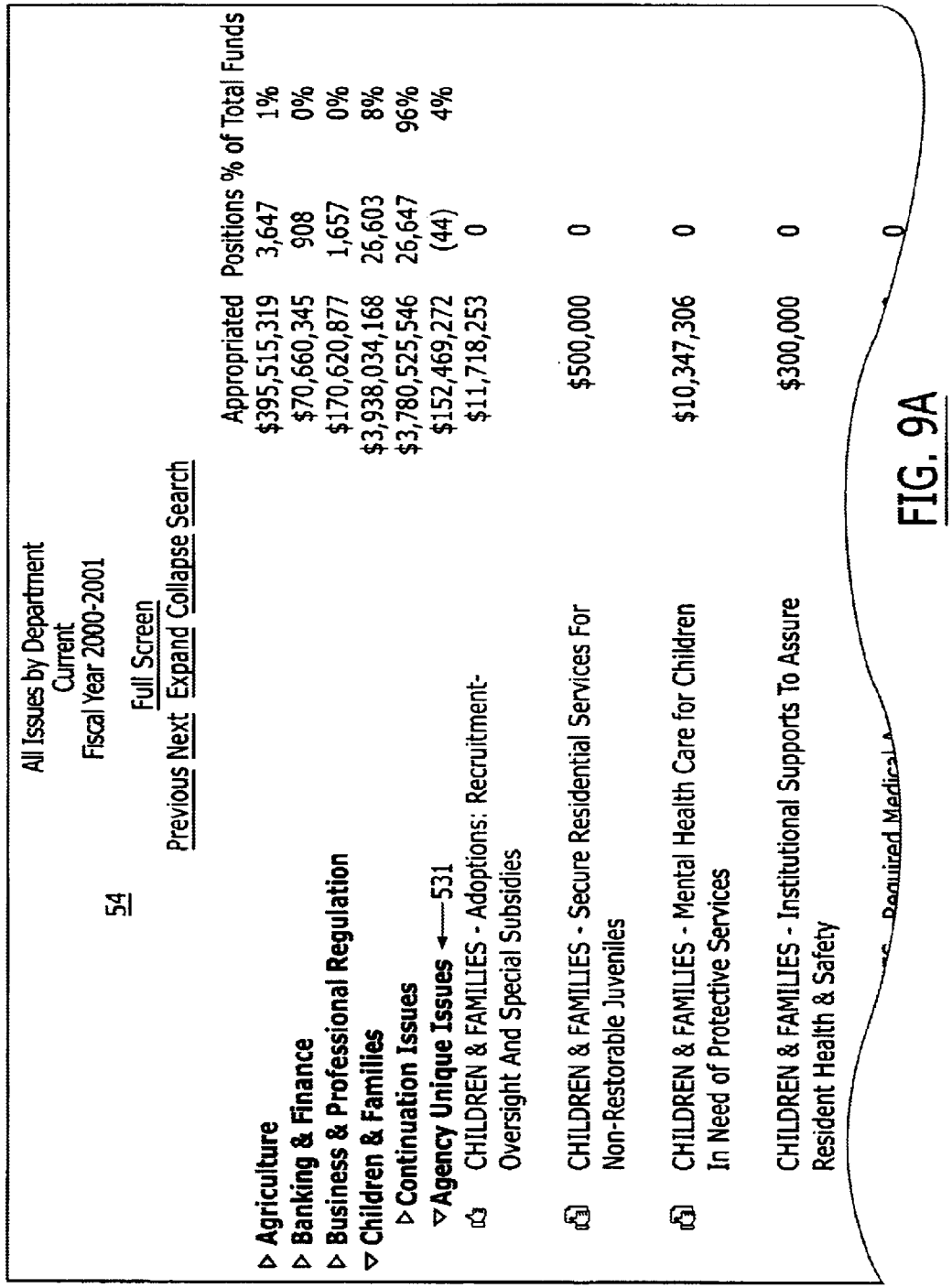
Figure 9B:
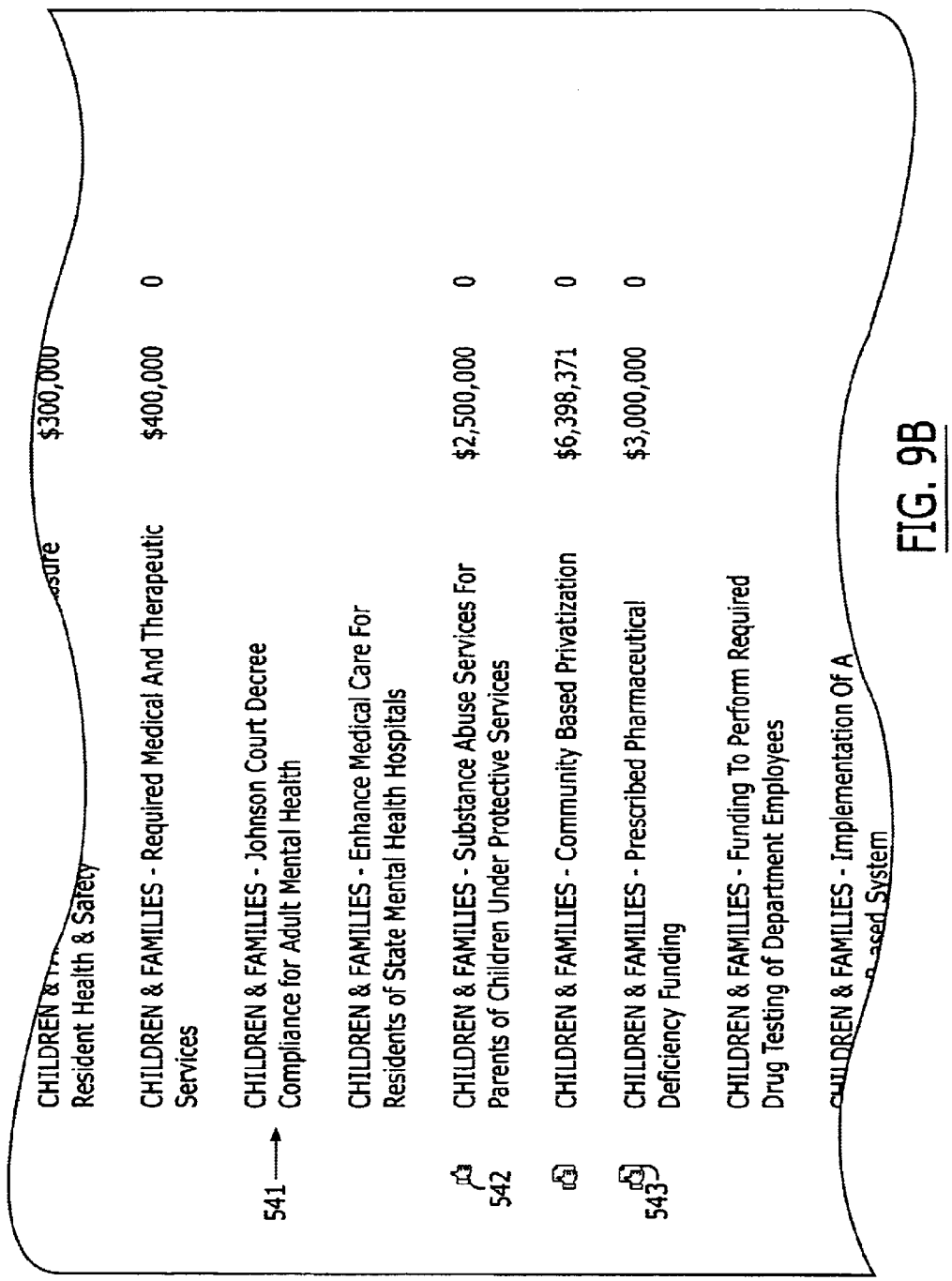

The method for viewing details of a budget is illustrated in flowchart form in FIG. 6. If the user selects the "budget details" tab 306, block 320 on FIG. 4, block 201 on FIG. 6, a screen 50 appears (FIG. 7) that lists all state budget issues 501 alphabetically for the current fiscal year. Tabulated on this screen 50 (block 322, FIG. 4) are data for appropriated spending 502, number of positions allocated 503, and the percentage of total budgeted funds 504. Similar screens are available for historical data 321 and planned future data 323.

An additional feature of this sector of the system 10 is the ability to "drill down" each budget issue 501 and display further divisions, or line items, under a selected budget issue 501. This is accomplished by selecting one of the issues (block 307, FIG. 6), which brings up screen 53 (FIG. 8), selected by selecting "Children & Families" 505 on FIG. 7. Here finer divisions 531 are broken out, in similar tabular form to FIG. 7.

Yet more information is available by selecting one of the line items 531, here "Agency Unique Issues," to bring up individual budget items 541 on screen 54 (FIG. 9, block 308 on FIG. 6), tabulated as before. Also indicated on this screen 54 to the left of the items 531 is how the funding on each item 531 arose, with icons indicating that the appropriation was agreed upon 542 or compromised upon 543.

Selecting one of the individual items 541 (block 309, FIG. 6) brings up a budget detail information screen 55 (FIG. 10). This screen 55 gives budgets 551 as proposed by various government sectors and the number of positions 552 proposed. Additionally, an issue narrative 553 that had been submitted by each state agency is presented.

Selecting the "Display Dollar Breakout Options" link 554 (block 316, FIG. 6) brings up a screen 56 (FIG. 11) indicating the funding sources 561, budgeted amount 562, and positions 563 for each breakdown. Yet further detail is available by selecting one of these sources 561 to bring up screen 57 (FIG. 12) to view agency budget details. Additional details may be accessed by drilling down into specific expense categories, selected by budgeting, accounting, accounting details, or personnel.

Thus, using the present system 10, detailed budget information can be accessed and reviewed for the current year, including agency budget request, governor's recommendations, legislative proposals, and a final conference committee report (i.e., a general appropriations act for the fiscal year). Access is also available for next year's budget preparation, beginning with the agency budget request, governor's recommendations, legislative proposals, and final conference committee report. Searches can be performed on a word or group of words and can have results reported by continuation base, agency initiatives, and capital outlay projects.

In addition to "drilling down" by selecting links on any of the available screens, it is also possible in the present system 10 to search by a keyword, by selecting the "Search" option 506 of any of screens 50, 53, 54 (block 317, FIG. 6). In the example screen 57 illustrated in FIG. 13, a search has been performed on the word caseload 571, with a list of linked items 572 tabulated as previously.

The features of this aspect of the invention include the ability for the user to look at an agency from different perspectives, such as business, accounting, budgeting, or personnel, and from that perspective to drill down to view other aspects of the budget. As an example, if the user wished to review travel expenses, he/she would select the "accounting" portion and drill down to view the business processes that use the most travel monies, view personnel areas that use the most travel monies, investigate when the travel occurs during a fiscal year, or reveal what portion of the budgeted travel money has been spent to date.

Figure 13:
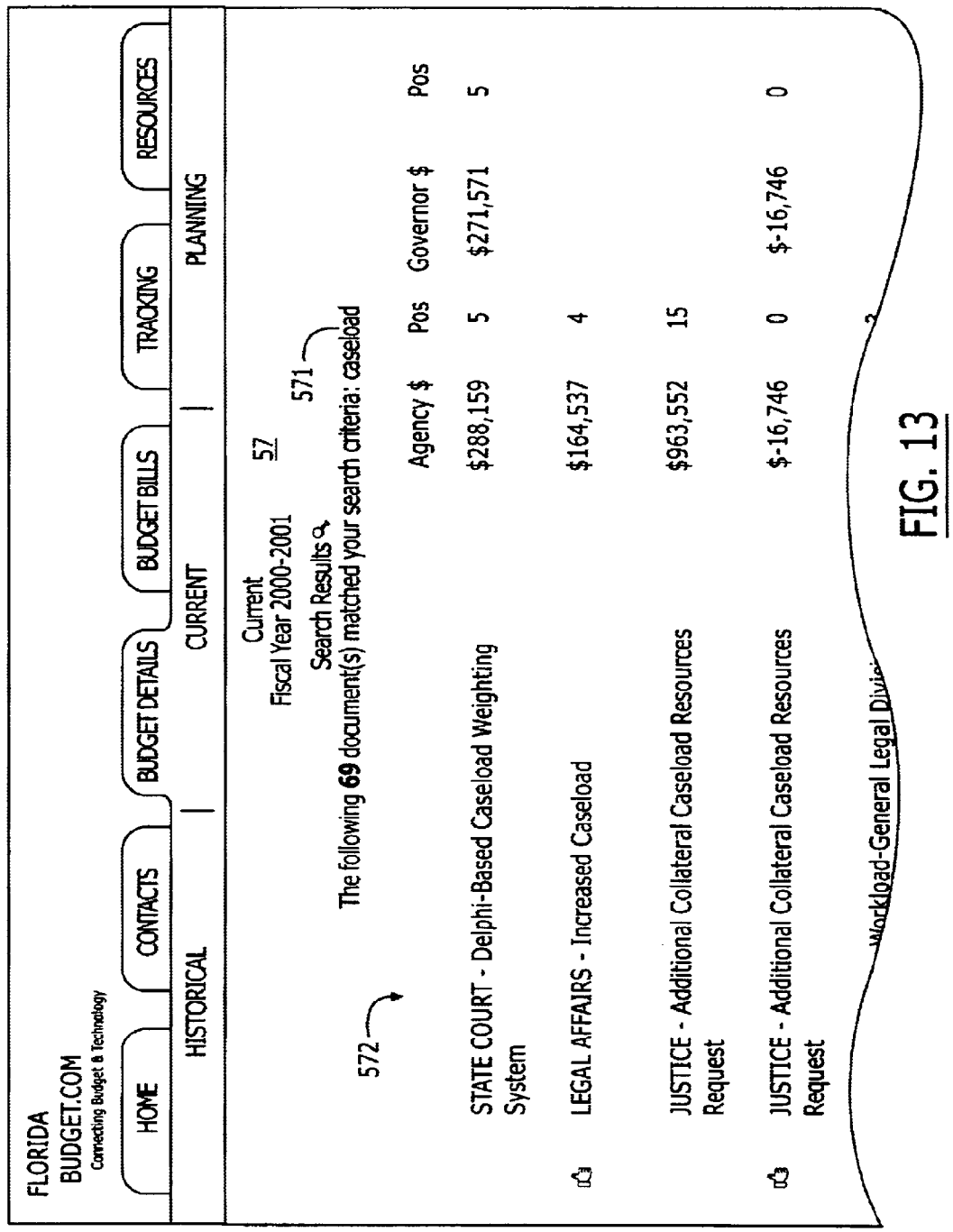
FIG. 13 is a screen giving search results.
Figure 13A:
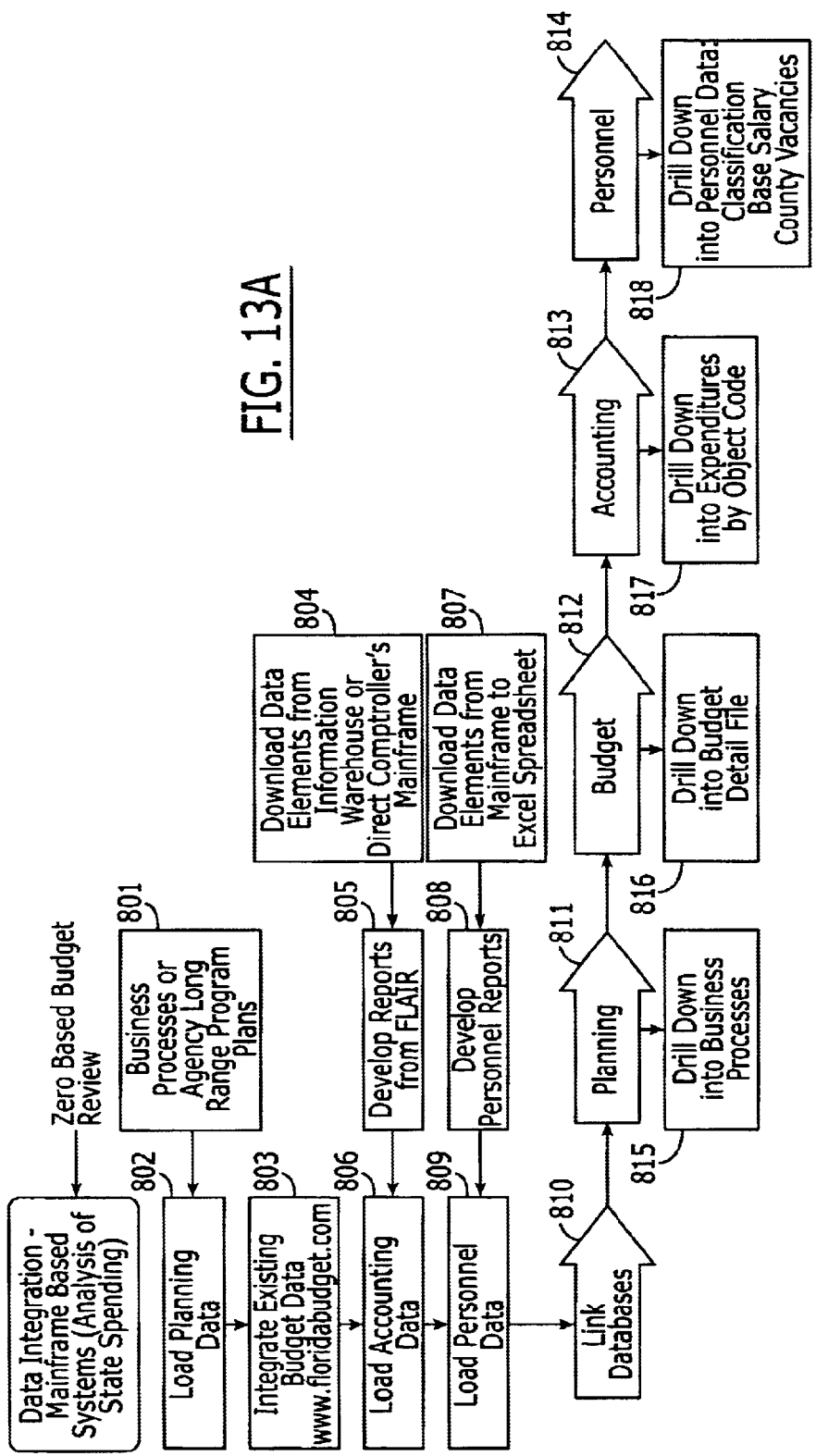
FIG. 13A is a data flow chart of the data integration system.

All data are listed by agency, and are related across the modules by business function. The system allows agency analysis by business function, and a creation of analysis/recommendation documents at multiple levels, such as business process entry, agency structural hierarchy (department, division, bureau), and composite functionality, by pulling together business processes or hierarchical function levels, for example. An overview is presented in FIG. 13A, wherein planning data are loaded into the system (block 802) from business processes or agency long-range program plans (block 801), and existing budget data are integrated (block 803). Data elements are downloaded from a source of data (block 804), reports are generated (block 805), and the accounting data are loaded (block 806). Data elements are also downloaded from a source to a spreadsheet application (block 807), personnel reports are developed (block 808), and personnel data are loaded (block 809).

With the data loaded, the databases are linked (block 810), and the planning (block 811), budget (block 812), accounting (block 813), and personnel (block 814) modules created. From these the user can drill down, respectively, into business processes (block 815), budget detail files (block 816), expenditures by object code (block 817), and personnel data classified by such subcategories as base salary, location, and vacancies (block 818).

Figure 14:
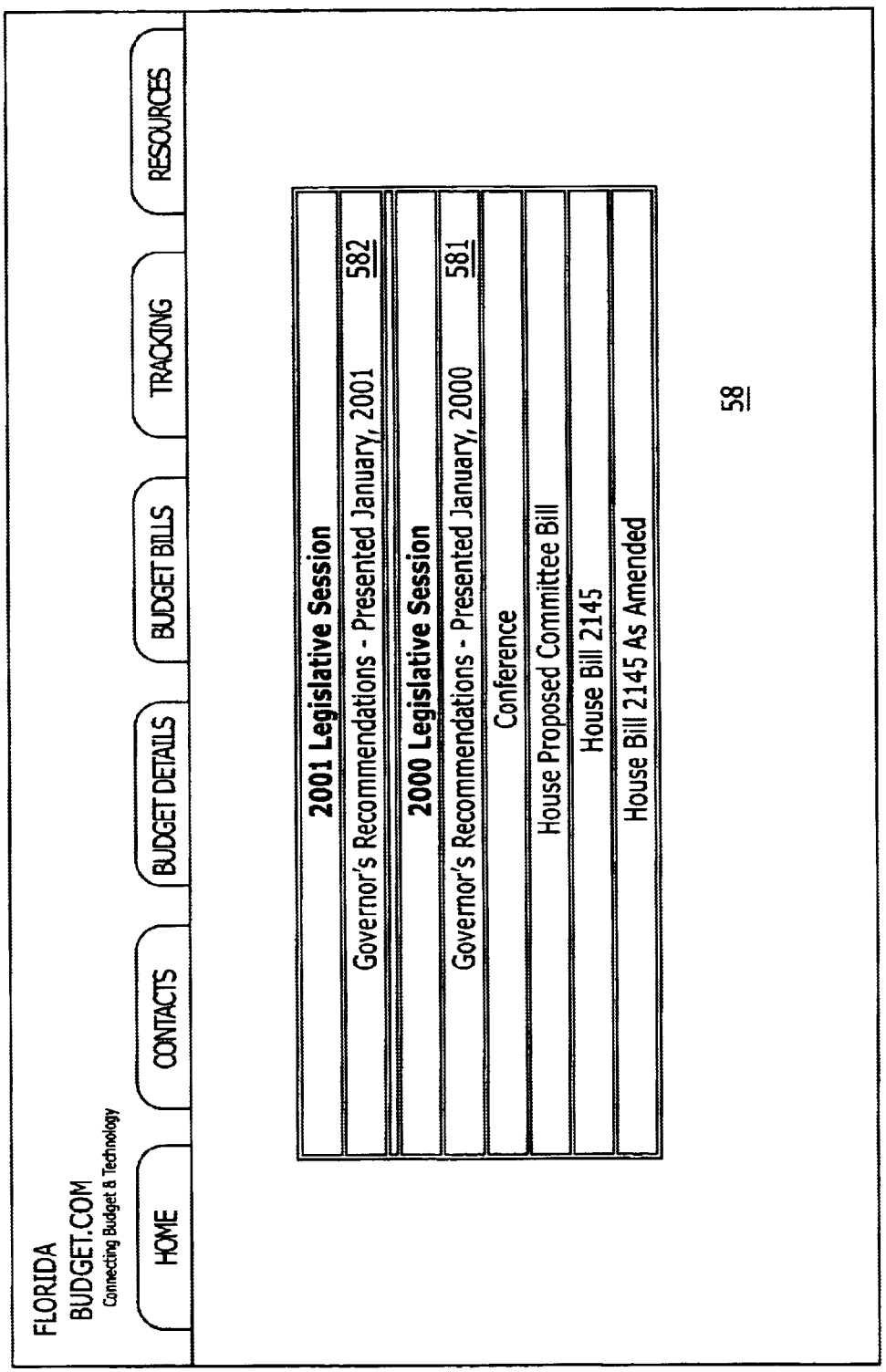
FIG. 14 is a screen listing budget bills.
Figure 15:
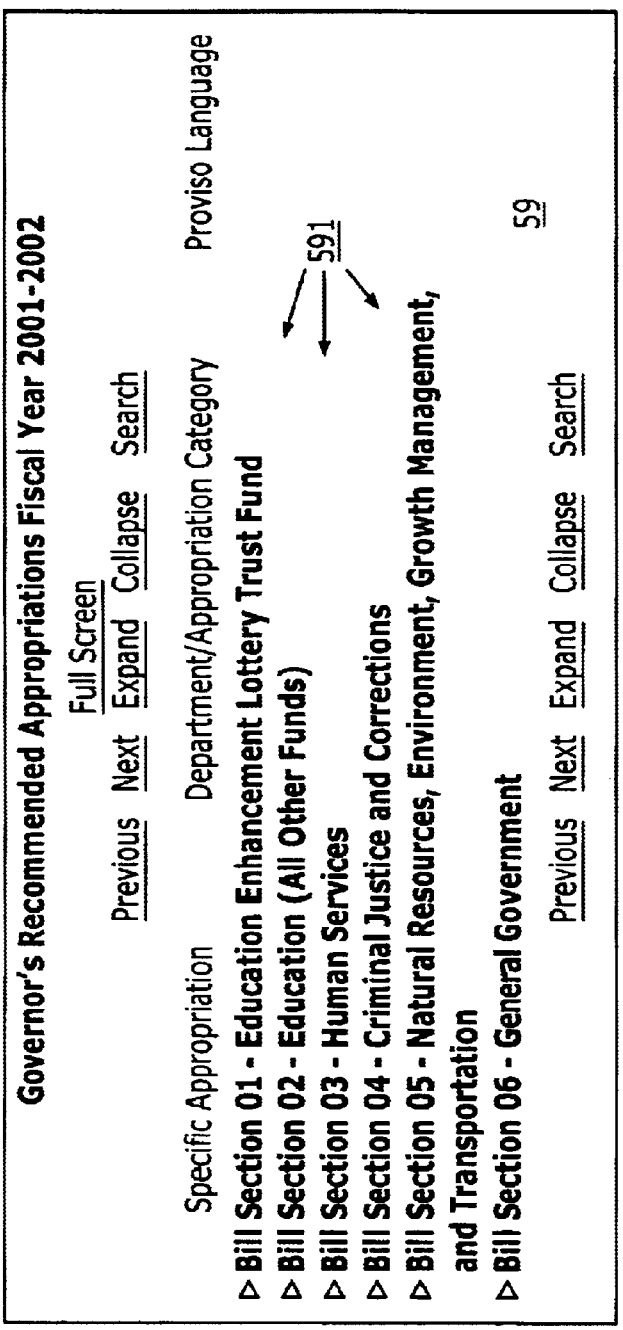
FIG. 15 is a screen showing section titles of a selected bill.
Figure 16:
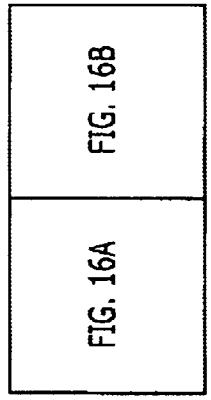
FIG. 16 is a screen expanding on a selected section to give items and associated verbiage.
Figure 16A:
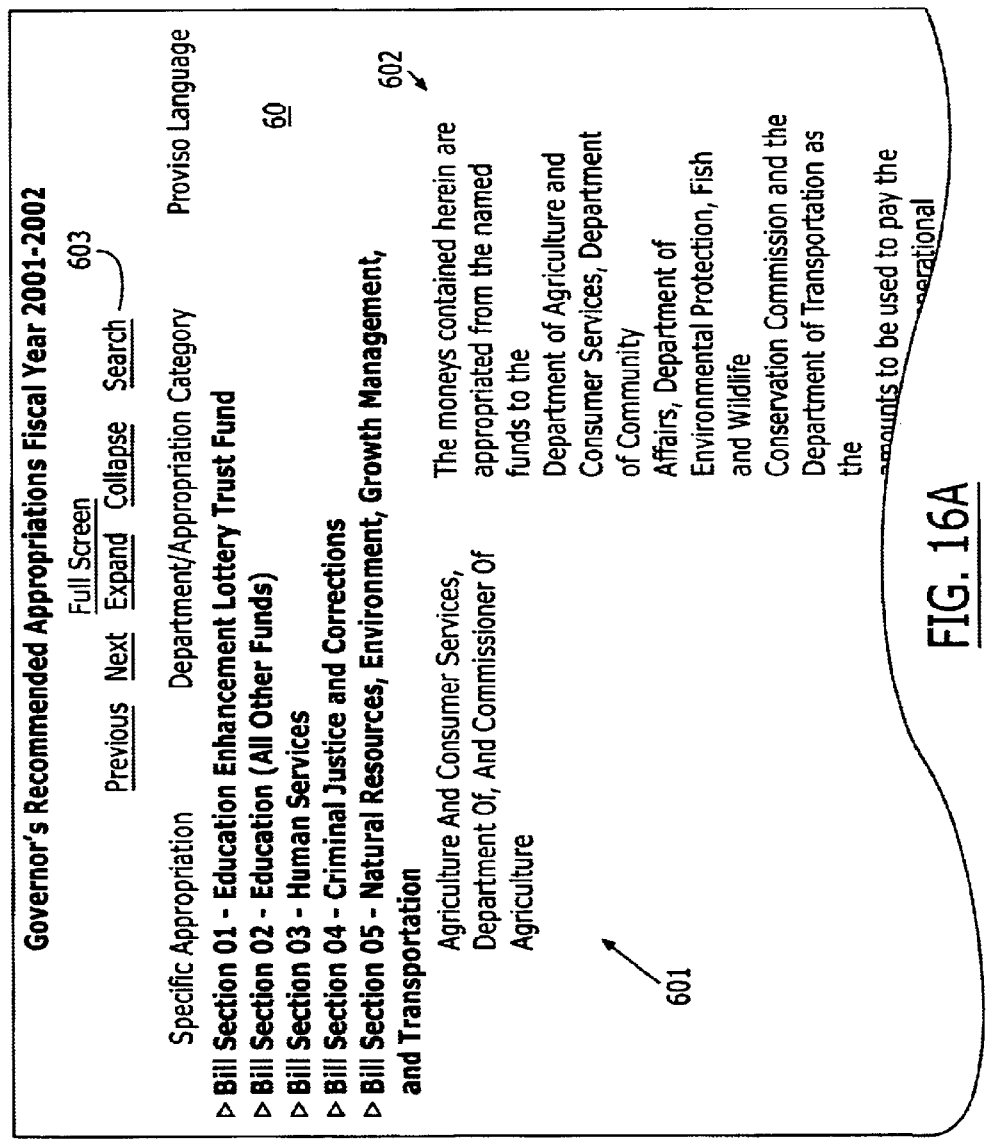

The next sector of the system, budget bills 32, is accessed by selecting tab 306, which brings up a summary of budget bills on screen 58 (FIG. 14; blocks 330–339). This screen 58 contains bills for current 581 and next 582 fiscal years, each listed item linked to further data. Selecting the current session's governor's recommendations, for example, brings up screen 59 (FIG. 15), which lists bill sections 591. Each of these, in turn, is linked to a screen 60 (FIG. 16) that provides further details by agency 601, including appropriations details 602. These details 601 are again linked to an appropriation screen 61 (FIG. 17) containing information 613 sortable by fund 611 or issue/fund 612.

Searches are also available by selecting the "Search" option 603 on screen 60 (FIG. 16), the results of which appear as on screen 62 (FIG. 18) for the words law and school. Each of the listed items 621 tabulated under "Department/Appropriation Category" also has bill language 622 included and an appropriation number 623 for each. If one of these is selected, screen 63 (FIG. 19) appears, giving appropriations details 631.

If the user selects the "tracking" tab 308, a budget data tracking screen 63 (FIG. 20; block 340, FIG. 4) that permits the user to customize one or more of the subdivisions 631 to follow over the current fiscal year 341 or planning fiscal year 342 by updating any changes that occur in budget issues 343, 344 or specific budget bill items 345, 346 over time. Selecting a subdivision 631 places a checkmark in the associated box 632 and permits that item to be added to the tracking folder 633. If an item 631 is selected, screen 64 (FIG. 21) is brought up, including details 641 of the tracked folder. Selecting one of the tracked items 632, which appear in the user's folder 633, brings up screen 65 (FIG. 22), on which personalized comments can be made 651 to be retained with the user's folder and on which textual information 652 appears regarding the budget item. If a word or phrase is entered into box 634, screen 66 (FIG. 23) appears, wherein the search results are presented, along with links to the items' budget data.

If the user selects the "resources" tab 309 (block 350, FIG. 4), access may be gained to reference materials (block 351, FIG. 4) as listed on screen 67 (FIG. 24). The elements 671 of this list are all linked to information on subsequent screens, which include organizational charts, glossaries of terms, and user guide information. This list is not intended as a limitation, and other elements may be conceived by one of skill in the art.

Figure 25:
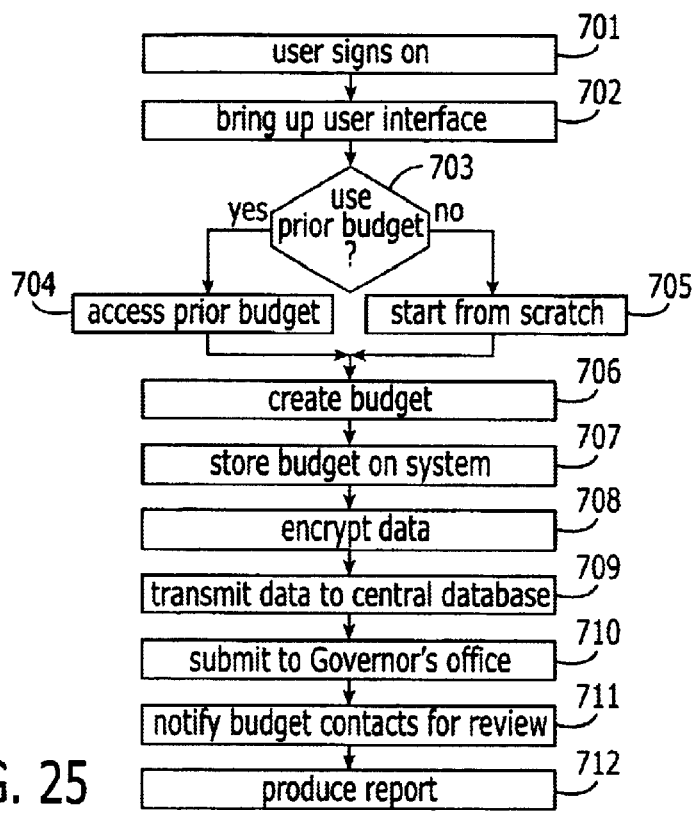
FIG. 25 is a flow chart illustrating a method of creating a budget using the system of the present invention.

The system 10 may also be used to create and submit a proposed budget for a subdivision, for example, for a state agency (FIG. 25). The user signs on to the system 10 (block 701) as described above and brings up an input interface (block 702). Typically the prior budget is accessed (blocks 703, 704), which enables updating rather than starting from scratch (block 705), although this is not mandatory. The budget is created as desired (block 706) and stored on the system 10 (block 707). The budget data are encrypted (block 708) and are transmitted to the central budget database 23 (block 709). The budget is also submitted to another entity, such as, for example, the Governor's Office of Planning and Budgeting (block 710), and budget contacts are automatically notified that the budget is available for review (block 711). The agency also produces a report on the proposed budget (block 712), based upon templates provided in the system 10. These templates are flexible and can be tailored to the user's desires.

Among the benefits of this aspect of the invention are that access is permitted at substantially any time and that secure transactions are assured. Online help is available, and access is permitted to budget preparation guidelines and recommendations. Discussion areas are available secured to each agency to provide agency-specific knowledge management. Finally, real-time access is permitted to budget contacts in the Governor's office, House, and Senate for assistance as soon as available.

Figure 26:
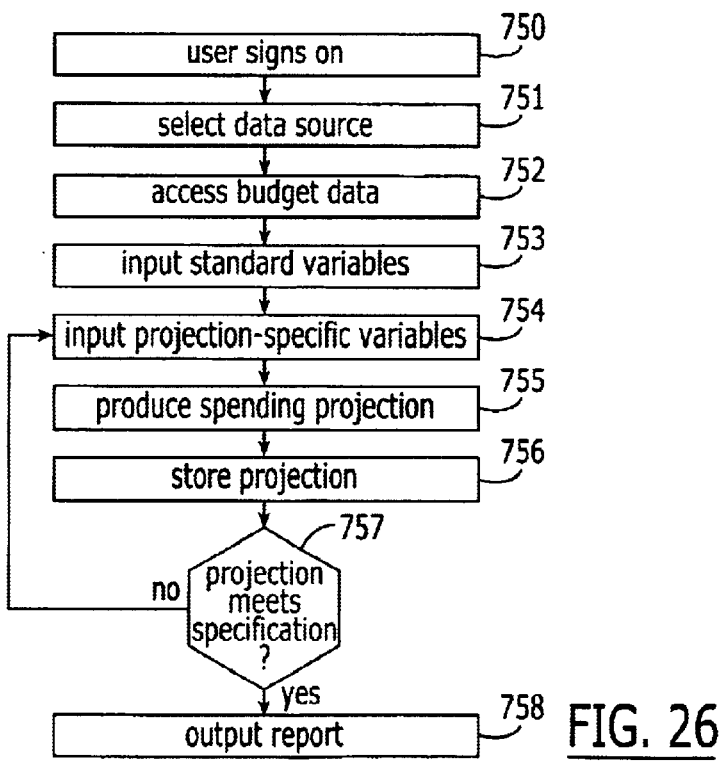
FIG. 26 is a flow chart illustrating a method of performing formula-based budget projection.

Yet a further aspect of the present invention is a module for performing formula-based budget projections (FIG. 26).

The user signs on as above (block 750) and selects from a user interface at least one source of data to be used in a model (block 751). In the case of a state budget, for example, county and/or tax roll data can be accessed (block 752). Then other standard variables may be input by the user (block 753), such as, but not limited to, base student allocation, spending category totals such as on transportation or books. Projection specific variables are also input by the user (block 754). A new spending category can be determined by executive/legislative policy, for example.

With the input provided to the system 10, a spending projection is produced, for example, for each county (block 755), and the projection is stored on the system (block 756). Further iterations may be carried out (block 757) until the projection meets an intended budget-policy specification. A report can be output if desired (block 758).

Among the features of this aspect of the invention are that it is easy to use, has online help available on inputs needed from the user, provides iterative processing, provides access to supporting data from multiple years as desired, is available over the Internet, and can provide reports to other interested linked parties.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A budget information and creation system comprising:
   a budgetary information database comprising numerical data and textual identifiers imported from a plurality of remote sites, each site housing data for an aspect of a budget for a plurality of subdivisions of a unitary organization, the numerical data extracted from the remote sites into a spreadsheet application, the textual identifiers extracted from the remote sites into a word processing application the database configured into a coherent hierarchical format having accessible links to budget data for the plurality of subdivisions;
   means for interfacing with a user remote from the database over a network;
   means for permitting the user to create a budget for one of the subdivisions using at least some of the numerical data and textual identifiers;
   means for transmitting the created budget to a predetermined remote site; and
   means for automatically notifying a contact agent within the organization that the created budget has been transmitted to the predetermined remote site, the contact agent appropriate to the subdivision.

2. The budget information system recited in claim 1, further comprising means for outputting a report comprising the created budget, the report presented in a user-defined format.

3. The budget information system recited in claim 2, further comprising means for authenticating the user prior to permitting the user access to the budgetary database.

4. The budget information system recited in claim 3, wherein:
   the database comprises data on at least one contact agent for each subdivision and contact information for each contact agent; and
   the system further comprises means for permitting the user to access a selected contact.

5. The budget information system recited in claim 4, wherein the presented contact information comprises a direct contact electronic linkage therewith.

6. The budget information system recited in claim 1, wherein the budget creation permitting means comprises:
   means for entering the proposed budget data into a spreadsheet application;
   means for entering text material related to the proposed budget data into a word processing program; and
   means for correlating the text material and the output budget data for presentation on a unitary screen.

7. The budget projection system recited in claim 1, further comprising:
   means for permitting the user to import and view a prior budget for one of the subdivisions using at least some of the numerical data and textual identifiers;
   means for the user to enter a projection variable; and
   means for calculating a projected budget based upon the projection variable and the prior budget.

8. The method recited in claim 7, further comprising the steps of:
   importing and displaying a prior budget for one of the subdivisions using at least some of the numerical data and textual identifiers;
   entering a projection variable; and
   calculating a projected budget based upon the projection variable and the prior budget.

9. The system recited in claim 1, further comprising means for receiving from the user a selection of a second subdivision desired to be tracked over time, means for creating an electronic folder specific to the user linked to data on the second subdivision, and means for updating the second subdivision data automatically upon subsequent user access of the database.

10. A method for creating a budget for a subdivision of a budgetary entity, the method comprising the steps of:
    entering an electronic user site, the user site linked to a remote budgetary database comprising numerical data and textual identifiers imported from a plurality of remote sites, each site housing data for an aspect of a budget for a plurality of subdivisions of a unitary organization, the numerical data extracted from the remote sites into a spreadsheet application, the textual identifiers extracted from the remote sites into a word processing application, the database configured into a coherent hierarchical format having accessible links to budget data for the plurality of subdivisions;
    electronically selecting one of the subdivisions, each subdivision electronically linked to prior fiscal period budget data therefor;
    creating a new proposed budget for the subdivision;
    transmitting the new proposed budget to a predetermined remote site and to the remote budgetary database;
    automatically notifying a contact at a remote site to which the subdivision pertains that the created budget has been transmitted to the predetermined remote site.

11. The method recited in claim 10, wherein the budgetary database comprises governmental funding data and the subdivisions comprise government agencies.

12. A method for providing to a user integrated budget data from a plurality of governmental agencies for permitting the user to create a new budget therefrom, the method comprising the steps of:

accessing a plurality of sources of budget data, each source containing budget data on at least one governmental agency;

extracting numerical data from the plurality of accessed sources into a spreadsheet application, the numerical data segregated into a first level containing aggregated agency data by department and a second level containing a plurality of subsets of data for each department;

extracting textual identifiers associated with the numerical data from the plurality of accessed sources into a word processing application;

extracting a textual narrative for each member of the plurality of subsets from the plurality of accessed sources into the word processing application;

creating a budgetary information database on a computer remote from the sources of budget data, the database comprising the extracted numerical data, the extracted textual identifiers, and the extracted textual narratives;

providing a first interface with the database for access by a user, the first interface containing the first-level data;

providing a second interface with the database for access by the user, the second interface accessible by selecting a department from the first interface, the second interface containing the second-level data for the selected department;

providing a third interface with the database for access by the user, the third interface accessible by selecting a first subset of the second-level data from the second interface, the third interface containing the textual narrative associated with the first subset;

receiving from the user an undated budget for the first subset; and transmitting the undated budget to at least one of the sources of budget data.

13. The method recited in claim 12, further comprising the steps of:

extracting contact agent and electronic contact agent contact data from the plurality of accessed sources;

incorporating the extracted contact agent and contact data into the database; and following the transmitting step, automatically electronically notifying a contact to which the first subset pertains that the updated budget has been transmitted to the at least one of the sources of budget data.

14. The method recited in claim 13, further comprising the step of transmitting the undated budget to a governmental planning agency.

15. The method recited in claim 12, further comprising the steps of creating a desired report format and outputting a report on the undated budget in the desired format.

16. The method recited in claim 15, wherein the desired report format is selected from a group consisting of a predefined template housed in the database and a user-defined template.

17. The method recited in claim 12, further comprising the steps of providing a fourth interface with the database for access by the user, the fourth interface for entering a search term thereinto, performing a search of the database based upon the search term, and outputting a result of the search to the user.

18. The method recited in claim 12, further comprising the steps of receiving from the user a selection of a second subset of the second-level data desired to be tracked over time, creating an electronic folder specific to the user linked to data on the second subset, and updating the second subset data automatically upon subsequent user access of the database.

19. The method recited in claim 10, further comprising the steps of receiving from the user a selection of a second subdivision desired to be tracked overtime, creating an electronic folder specific to the user linked to data on the second subdivision, and updating the second subdivision data automatically upon subsequent user access of the database.

* * * * *